(12) United States Patent
Fan et al.

(10) Patent No.: US 9,274,817 B1
(45) Date of Patent: Mar. 1, 2016

(54) STORAGE QUALITY-OF-SERVICE CONTROL IN DISTRIBUTED VIRTUAL INFRASTRUCTURE

(71) Applicant: EMC Corporation, Hopkinton, MA (US)

(72) Inventors: Chenhui Fan, Shanghai (CN); Ziye Yang, Shanghai (CN); Lintao Wan, Shanghai (CN); Xi Chen, Shanghai (CN); David Black, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 310 days.

(21) Appl. No.: 13/731,271

(22) Filed: Dec. 31, 2012

(51) Int. Cl.
*G06F 9/455* (2006.01)

(52) U.S. Cl.
CPC .................................... *G06F 9/455* (2013.01)

(58) Field of Classification Search
None
See application file for complete search history.

(56) References Cited

U.S. PATENT DOCUMENTS

| | | | |
|---|---|---|---|
| 8,825,964 B1* | 9/2014 | Sopka et al. | 711/152 |
| 8,863,124 B1* | 10/2014 | Aron | 718/1 |
| 2005/0114464 A1* | 5/2005 | Amir et al. | 709/213 |
| 2009/0172666 A1* | 7/2009 | Yahalom et al. | 718/1 |
| 2009/0290501 A1* | 11/2009 | Levy et al. | 370/250 |
| 2009/0300302 A1* | 12/2009 | Vaghani | 711/162 |
| 2010/0058340 A1* | 3/2010 | Kamada | 718/1 |
| 2010/0106816 A1* | 4/2010 | Gulati et al. | 709/223 |
| 2010/0235832 A1* | 9/2010 | Rajagopal et al. | 718/1 |
| 2011/0078682 A1* | 3/2011 | Doan et al. | 718/1 |
| 2011/0093849 A1* | 4/2011 | Chawla et al. | 718/1 |
| 2011/0176551 A1* | 7/2011 | Chawla et al. | 370/395.31 |
| 2012/0047346 A1* | 2/2012 | Kawaguchi | 711/165 |
| 2012/0054624 A1* | 3/2012 | Owens et al. | 715/735 |
| 2012/0254567 A1* | 10/2012 | Umbehocker | 711/162 |
| 2012/0266177 A1* | 10/2012 | Kakeda et al. | 718/104 |
| 2013/0081015 A1* | 3/2013 | Noma et al. | 718/1 |
| 2013/0111033 A1* | 5/2013 | Mao et al. | 709/226 |
| 2013/0139160 A1* | 5/2013 | Yahalom et al. | 718/1 |
| 2013/0144587 A1* | 6/2013 | Sakaki et al. | 703/13 |
| 2013/0238790 A1* | 9/2013 | Gulati et al. | 709/224 |
| 2013/0298123 A1* | 11/2013 | Zuo et al. | 718/1 |
| 2013/0332927 A1* | 12/2013 | Tang et al. | 718/1 |
| 2013/0346615 A1* | 12/2013 | Gondi | 709/226 |

(Continued)

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

*Primary Examiner* — Emerson Puente
*Assistant Examiner* — Mehran Kamran
(74) *Attorney, Agent, or Firm* — Ryan, Mason & Lewis, LLP (57) ABSTRACT

Techniques for delivering and measuring storage quality-of-service to virtual machines in a distributed virtual infrastructure. In one example, a method comprises the following steps. A controller obtains quality-of-service data from at least a portion of components of a distributed virtual infrastructure, wherein the components of the distributed virtual infrastructure comprise one or more storage units, one or more processing units, and one or more switches operatively coupled to form the distributed virtual infrastructure. The controller manages at least one input/output request throughout a path defined by at least one of the one or more processing units, at least one of the one or more switches, and at least one of the one or more storage units, based on at least a portion of the collected quality-of-service data.

19 Claims, 6 Drawing Sheets

(56) References Cited

U.S. PATENT DOCUMENTS

| | | | |
|---|---|---|---|
| 2014/0173113 A1* | 6/2014 | Vemuri et al. | 709/226 |
| 2014/0189682 A1* | 7/2014 | Crudele et al. | 718/1 |
| 2014/0244929 A1* | 8/2014 | Acharya et al. | 711/114 |
| 2014/0281026 A1* | 9/2014 | Guo et al. | 709/238 |
| 2014/0282547 A1* | 9/2014 | Srinivasan et al. | 718/1 |

* cited by examiner

STORAGE QUALITY-OF-SERVICE CONTROL IN DISTRIBUTED VIRTUAL INFRASTRUCTURE

FIELD

The field relates to computing systems implemented via a distributed virtual infrastructure, and more particularly to techniques for delivering and measuring storage quality-of-service to virtual machines in such a distributed virtual infrastructure.

BACKGROUND

In a distributed virtual infrastructure characterized by arrays of virtual storage devices (logical units or LUNs) being accessed by virtual computing devices (virtual machines or VMs), there is an inability to ensure quality-of-service (QoS) delivery from the storage arrays to the VMs.

Traditionally, servers were attached to a storage network and LUNs were allocated to the servers. Examples of such storage networks include, for example, an Internet Small Computer System Interface (iSCSI) network, a Fibre Channel (FC) network, a Fibre Channel over Ethernet (FCoE) network, and an Infiniband network. In these traditional systems, the required network bandwidth and load on storage (in terms of input/output operations per second or IOPS) was fairly consistent and predictable.

However, in a virtualized environment, issues associated with VM over-subscription (i.e., running too many VMs on too few physical processing devices), VM abstraction (i.e., not being able to easily determine which physical processing devices are hosting which VMs), and VM explosion (i.e., a rapid instantiation of a large number of VMs) make it difficult to diagnose performance contention issues.

SUMMARY

Embodiments of the invention provide techniques for delivering and measuring storage quality-of-service to virtual machines in a distributed virtual infrastructure.

In one embodiment, a method comprises the following steps. A controller obtains quality-of-service data from at least a portion of components of a distributed virtual infrastructure, wherein the components of the distributed virtual infrastructure comprise one or more storage units, one or more processing units, and one or more switches operatively coupled to form the distributed virtual infrastructure. The controller manages at least one input/output request throughout a path defined by at least one of the one or more processing units, at least one of the one or more switches, and at least one of the one or more storage units, based on at least a portion of the collected quality-of-service data.

In another embodiment, a computer program product is provided which comprises a processor-readable storage medium having encoded therein executable code of one or more software programs. The one or more software programs when executed by at least one processor implement steps of the above-described method.

In yet another embodiment, an apparatus comprises a memory and a processor operatively coupled to the memory and configured to perform steps of the above-described method.

Advantageously, illustrative embodiments described herein provide techniques for ensuring quality-of-service delivery from the storage arrays to the virtual machines in a distributed virtual infrastructure, and thus improving the diagnosis of performance contention issues.

These and other features and advantages of the present invention will become more readily apparent from the accompanying drawings and the following detailed description.

DETAILED DESCRIPTION

Embodiments of the present invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

As used herein, the phrase "quality-of-service" (QoS) refers to resource control mechanisms. For example, QoS is the ability to provide different resource reservation priorities to different entities such as, but not limited to, applications, users, devices and data flows, or to guarantee a certain level of performance to one or more of such entities. By way of example only, a required bit rate, delay, jitter, packet dropping probability and/or bit error rate may be guaranteed.

Figure 1A:
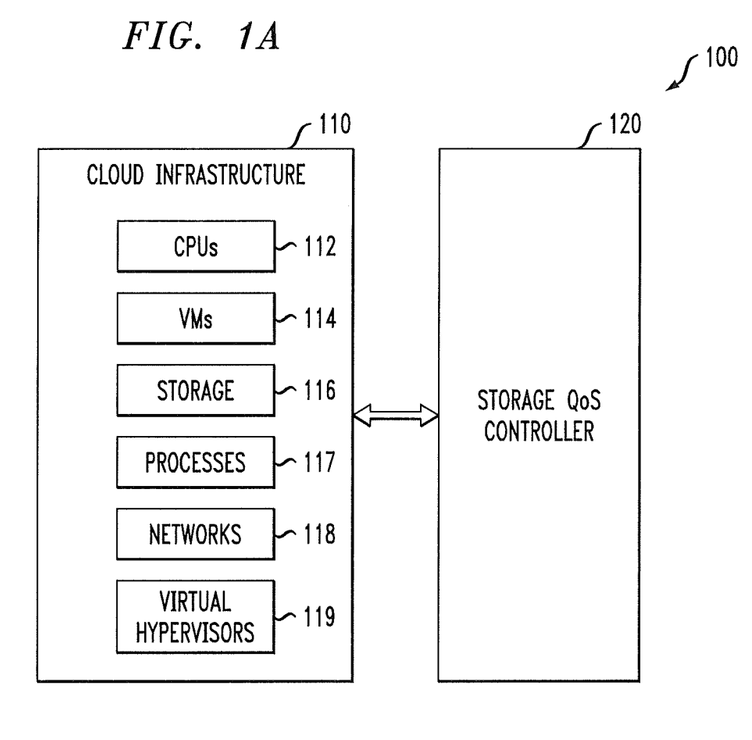
FIG. 1A illustrates cloud infrastructure and a storage QoS controller in accordance with one embodiment of the invention.

FIG. 1A shows a system 100 configured in accordance with an illustrative embodiment of the present invention. The system 100 comprises cloud infrastructure 110 and a storage QoS controller 120. As will be explained in detail below, the storage QoS controller 120 delivers and measures storage quality-of-service to virtual machines in a distributed virtual infrastructure implemented within cloud infrastructure 110, as will be explained in detail herein. Cloud infrastructure 110 is illustratively depicted in the figure as comprising an execution environment with execution components comprising one or more central processing units (CPUs) 112, one or more virtual machines (VMs) 114, and storage devices 116 (upon which logical units (LUs) are implemented) that execute one or more processes 117 that operate on one or more process input data sets that generate one or more process output data sets. The execution environment also comprises one or more networks 118 and one or more virtual hypervisors 119.

Although system elements 110 and 120 are shown as separate elements in FIG. 1A, these elements or portions thereof may be implemented at least in part on a common processing platform. In other embodiments, one or more of the system elements 110 and 120 may each be implemented on a separate processing platform, such as the processing platform to be described below in conjunction with FIG. 2. For example, the cloud infrastructure 110 may be implemented on a first processing device of a first processing platform and the storage QoS controller 120 may be implemented on a second processing device of a second processing platform. It is also to be understood that a given embodiment of the system 100 may include multiple instances of the system elements 110 and 120, although only single instances of such elements are shown in the system diagram for clarity and simplicity of illustration.

Figure 1B:
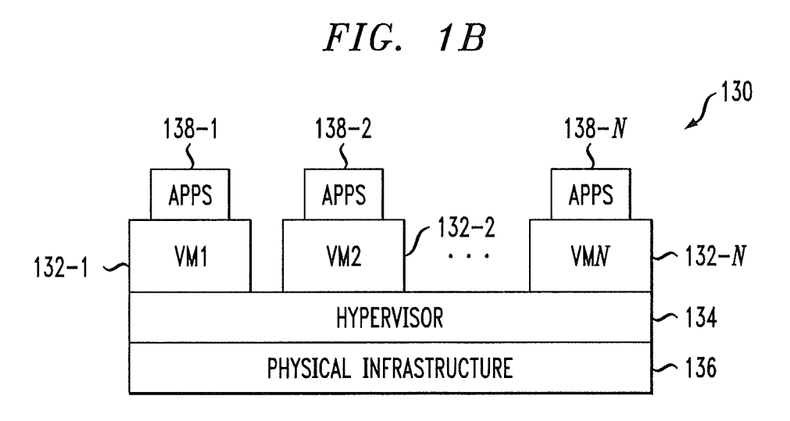
FIG. 1B illustrates a more detailed view of the cloud infrastructure of FIG. 1A.

As shown in FIG. 1B, the cloud infrastructure 130 (corresponding to 110 in FIG. 1A) comprises virtual machines (VMs) 132-1, 132-2, ... 132-N implemented using a hypervisor 134. The hypervisor 134, as mentioned above, is an example of what is more generally referred to herein as "virtualization infrastructure." The hypervisor 134 runs on physical infrastructure 136 (e.g., such as may include CPUs 112 and/or storage devices 116 in FIG. 1A). The cloud infrastructure 130 further comprises sets of applications 138-1, 138-2, ... 138-N running on respective ones of the virtual machines 132-1, 132-2, ... 132-N (utilizing associated LUs) under the control of the hypervisor 134.

Although only a single hypervisor 134 is shown in the example of FIG. 1B, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 134 which, as shown in FIG. 1B, is directly inserted on top of the computer hardware in order to allocate hardware resources of the physical computer (physical infrastructure 136) dynamically and transparently. The hypervisor 134 affords the ability for multiple operating systems to run concurrently on a single physical computer and share hardware resources with each other. The hypervisor 134 thus also manages disk I/O scheduling associated with the workloads performed by each virtual machine.

An example of a commercially available hypervisor platform that may be used to implement portions of the cloud infrastructure 130 (110) in one or more embodiments of the invention is the VMware® vSphere™ which may have an associated virtual infrastructure management system such as the VMware® vCenter™. The underlying physical infrastructure 136 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 130 (110).

Figure 2:
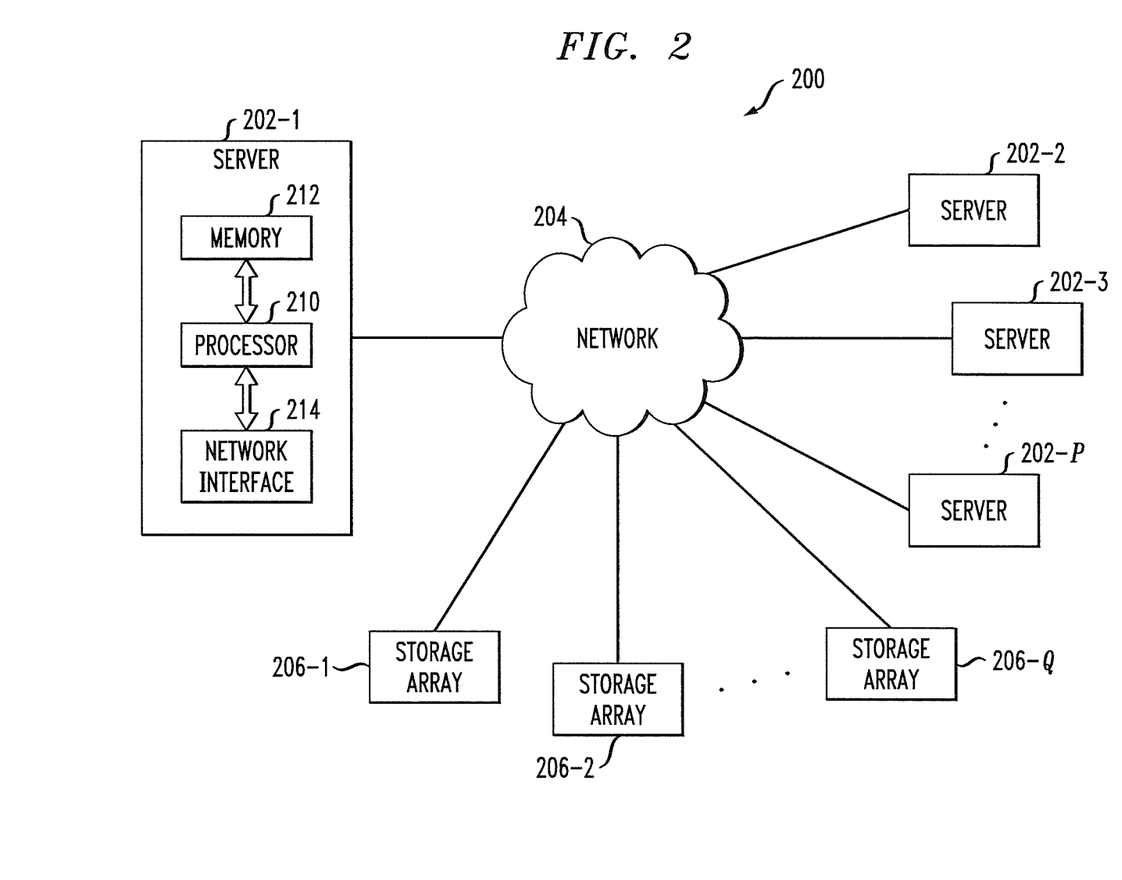
FIG. 2 illustrates a processing platform on which the cloud infrastructure and the storage QoS controller of FIG. 1A are implemented in accordance with one or more embodiments of the invention.

An example of a processing platform on which the cloud infrastructure 110 and/or the storage QoS controller 120 of FIG. 1A may be implemented is processing platform 200 shown in FIG. 2. The processing platform 200 in this embodiment comprises at least a portion of the system 100 and includes a plurality of servers denoted 202-1, 202-2, 202-3, ... 202-P, and a plurality of storage arrays 206-1, 206-2, ... 206-Q, which communicate with one another over a network 204. One or more of the elements of system 100 may therefore each run on one or more storage arrays, servers, computers or other processing platform elements, each of which may be viewed as an example of what is more generally referred to herein as a "processing device." As illustrated in FIG. 2, such a device generally comprises at least one processor and an associated memory, and implements one or more functional modules for controlling certain features of system 100. Again, multiple elements or modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product." A computer program product comprises a processor-readable storage medium (which is a non-transitory medium) having encoded therein executable code of one or more software programs. Such a memory may comprise electronic memory such as random access memory (RAM), read-only memory (ROM) or other types of memory, in any combination. The computer program code when executed by a processing device such as the server 202-1 causes the device to perform functions associated with one or more of the elements of system 100. One skilled in the art would be readily able to implement such software given the teachings provided herein. Other examples of computer program products embodying embodiments of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 and the storage arrays 206 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, logical units, etc. Again, the particular processing platform shown in FIG. 2 is presented by way of example only, and system 100 of FIG. 1A may include additional or alternative processing platforms, as well as numerous distinct processing platforms in any combination.

Also, numerous other arrangements of servers, computers, storage devices or other components are possible in system 100. Such components can communicate with other elements of the system 100 over any type of network, such as a wide area network (WAN), a local area network (LAN), a satellite network, a telephone or cable network, a storage network (e.g., FC), a converged network (e.g., FCoE or Infiniband) or various portions or combinations of these and other types of networks.

Illustrative details of the storage QoS controller 120, as well as operations of elements of controller 120 will now be described with reference to FIGS. 3 through 6.

Figure 3:
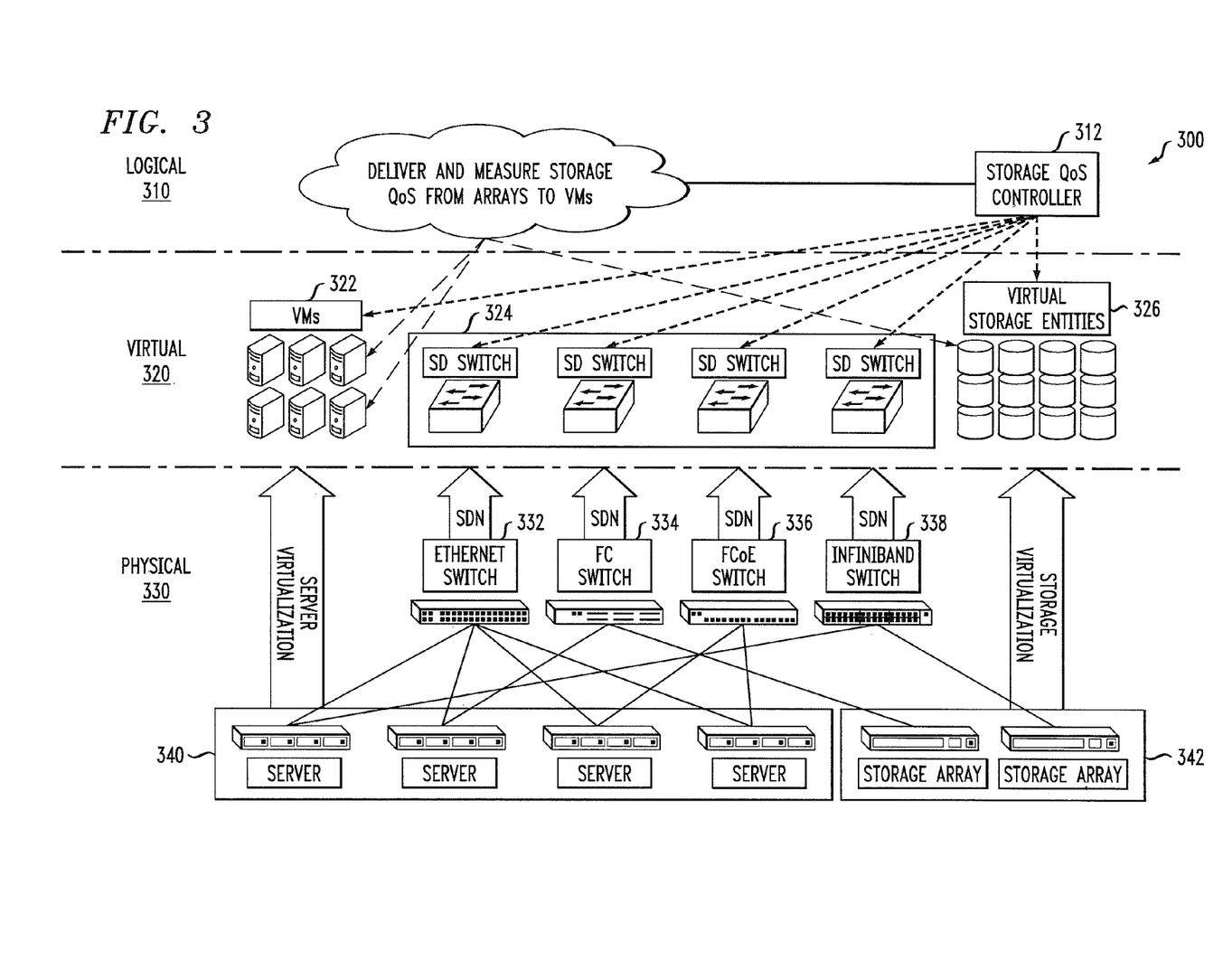
FIG. 3 illustrates a storage QoS control system in accordance with one embodiment of the invention.

FIG. 3 illustrates a storage QoS control system in accordance with one embodiment of the invention. It is to be appreciated that the control system 300 shown in FIG. 3 is a more detailed depiction of the system 100 shown in FIG. 1A. That is, the storage QoS controller 120 in FIG. 1A corresponds to the storage QoS controller 312 shown in FIG. 3, while the other components shown in FIG. 3 are controlled or otherwise managed by the storage QoS controller and correspond to components of cloud infrastructure 110, as will be explained in further detail below.

More specifically, the control system 300 comprises a logical layer 310, a virtual layer 320 and a physical layer 330. The logical layer 310 comprises a storage QoS controller 312 (which corresponds to the storage QoS controller 120 in FIG. 1A). The controller 312, inter alia, delivers and measures storage QoS from storage arrays to VMs in the system 300. The virtual layer 320 comprises VMs 322, software-defined (SD) switches 324, and virtual storage entities 326 (LUNs hosted by storage arrays). The physical layer 330 comprises a plurality of network switches including an Ethernet switch 332, an FC switch 334, an FCoE switch 336 and an Infiniband switch 338. The physical layer 330 also comprises servers 340 and storage arrays 342. It is to be appreciated that the virtual layer 320 and the physical layer 330 may comprise other components not expressly shown in FIG. 3, for example, but not limited to, switches for other network protocols, and processing devices other than servers and storage arrays.

Furthermore, it is to be appreciated that, in one or more embodiments, the system 300 may comprise any number (not just the number illustrated in FIG. 3) of severs 340, with virtual hypervisors deployed on the servers, and VMs 322 deployed across hypervisors (via server virtualization). The system 300 may also comprise any number (not just the number illustrated in FIG. 3) of storage arrays 342, with virtual storage entities 326 (e.g., LUNs) allocated on the storage arrays (via storage virtualization). Further, the system 300 may comprise any number (not just the number illustrated in FIG. 3) of switches 332 through 338 that connect servers 340 and storage arrays 342, including but not limited to Ethernet, FC, FCoE and Infiniband. The switches 332 through 338 are abstracted to software-defined switches 324 by applying software-defined networking (SDN or network virtualization) techniques. Still further, the storage QoS controller 312 manages QoS control over the other components (servers, VMs, storage arrays, LUNs, switches) in system 300 based on, for example, knowledge of QoS capacities and real-time I/O traffic awareness.

In one embodiment, the control system 300 is part of a data center whereby customers access computing and/or storage services provided via resources such as the servers, VMs, storage arrays, LUNs and switches of system 300.

Figure 4:
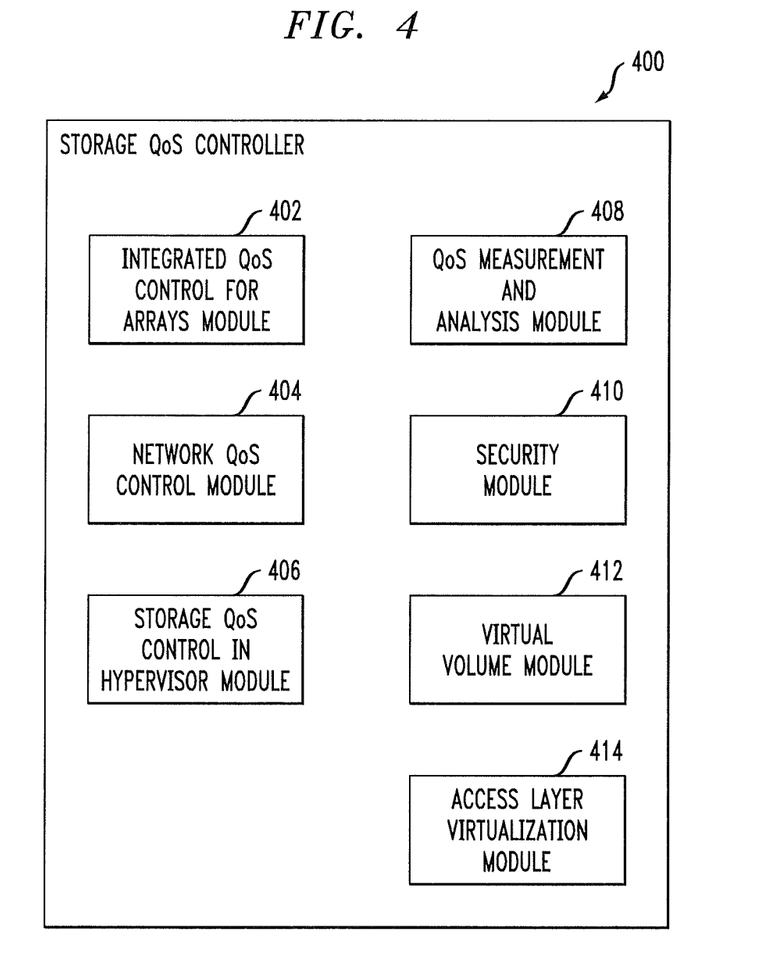
FIG. 4 illustrates components of a storage QoS controller in accordance with one embodiment of the invention.

FIG. 4 illustrates components of a storage QoS controller in accordance with one embodiment of the invention. The storage QoS controller 400 in FIG. 4 corresponds to the controller 312 of FIG. 3. As will be explained below, the storage QoS controller 400 collects knowledge from underlying components and performs QoS control over, for example, storage arrays, servers, networks, virtual hypervisors, etc.

As shown, storage QoS controller 400 comprises several main modules: an integrated QoS array control module 402; a network QoS control module 404; a storage QoS hypervisor control module 406; a QoS measurement and analysis module 408; a security module 410; a virtual volume module 412; and an access layer virtualization module 414. It is to be appreciated that the controller 400 may comprise other modules and functions not expressly shown in FIG. 4, as well as comprise a subset of the modules and functions that are expressly shown in FIG. 4.

The integrated QoS array control module 402 operates on the virtual storage entities 326 and the storage arrays 342. More specifically, the module 402 collects QoS information and monitors usage from individual storage arrays and is also used to guide storage provisioning (considering QoS besides capacity). In one embodiment, the module 402 is implemented as a thin layer of storage management (e.g., integrate with UniSphere® Remote or Navisphere® QoS Manager commercially available from EMC Corporation of Hopkinton, Mass.) with which virtual hypervisors interact for storage-related tasks instead of directly with individuals storage arrays.

The network QoS control module 404 operates on the switches 324 and 332 through 338. More specifically, the module 404 applies the SDN (software-defined network) methodology to various types of storage networks (generalization and optimization) by employing OpenFlow type technologies, as a basis of integrated network resource scheduling. Additionally, in accordance with embodiments of the invention, existing OpenFlow can be improved to support priority-based optimization for iSCSI/NFS (Network File System)/CIFS (Common Internet File System) data flow (natively recognizing). Besides separation of the control and data planes, SDN is used as a scheduling mechanism so the network paths can be recomputed on the fly, thus avoiding or at least reducing packet loss or congestion.

The storage QoS hypervisor control module 406 operates on the VMs 322 and the servers 340. More specifically, the module 406 implements QoS management for virtual hypervisors such as, for example, VMware® Storage I/O Control (SIOC), Network I/O Control (NIOC) and Powerpath® commercially available from EMC Corporation of Hopkinton, Mass. Moreover, virtual adapters can be implemented in accordance with module 406 to achieve both multi-tenancy and performance efficiencies.

The QoS measurement and analysis module 408 allows VMs to issue a group of collaborating I/O workloads to fully understand and exploit the I/O scheduling characteristics of the storage arrays and hypervisors and assist the development and improvement of storage products with respect to multi-tenancy scope. Information generated by module 408 can serve as a feedback to storage servers for further improvement. With the identified knowledge of the I/O scheduler, the system can measure I/O service level agreement (SLA) compliance of the storage arrays in a fine-grained manner. The module 408 can also perform trend and root-cause analysis, as well as fault management operations. The module 408 operates across all components of the control system 300.

The security module 410 prevents security attacks against the controller 400 and, in general, the control system 300. For example, the security module 410 prevents attacks against QoS and protects targets such as network QoS control module 404 and its functions. The security module 410 also provides protections for the other modules in the controller 400, and the components of the control system 300.

The virtual volume module 412 operates on the VMs 322, the SD switches 324, the virtual storage entities 326, the servers 340 and the storage arrays 342. More specifically, the module 412 provides the VMs 322 in the control system 300 with visibility to the storage arrays 342. The module 412 may comprise features which introduce LUN/sub-LUN type mapping for VMFS/VMDK (Virtual Machine File System/Virtual Machine Disk) so that the VMDK is offloaded to one or more storage arrays and can be managed by a VNX system directly.

The access layer virtualization module 414 operates on the VMs 322, the SD switches 324 and the servers 340. More specifically, the module 414 provides the VMs 322 in the control system 300 with visibility to other components in the control system 300, e.g., network switches 332 through 338, SD switches 324, etc. The module 414 can comprise features such as, but not limited to, VN-TagNEPA (Virtual Ethernet Port Aggregator)/NPIV (N-Port ID Virtualization)/VNPort) to bring VM visibility to network switches and storage arrays.

Figure 5:
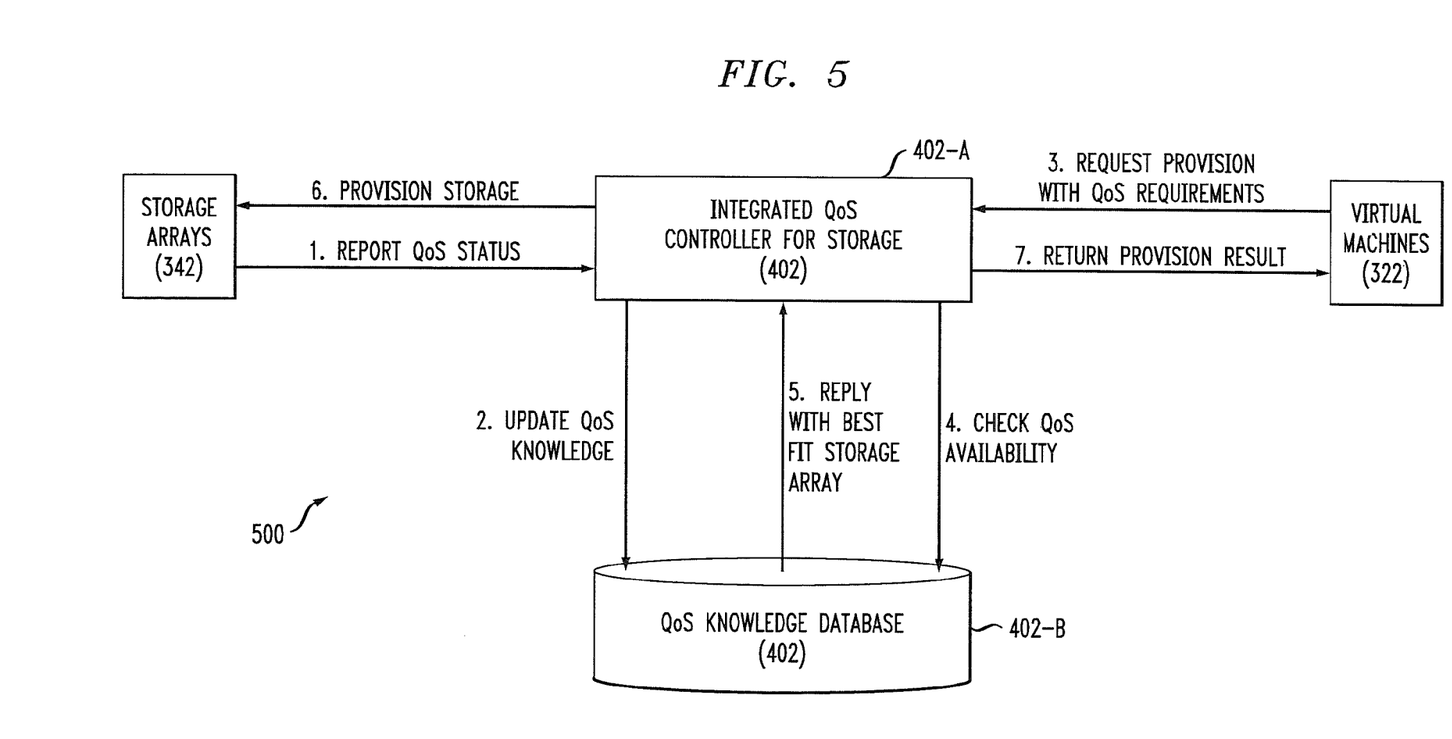
FIG. 5 illustrates a methodology for storage provisioning in accordance with one embodiment of the invention.
Figure 6:
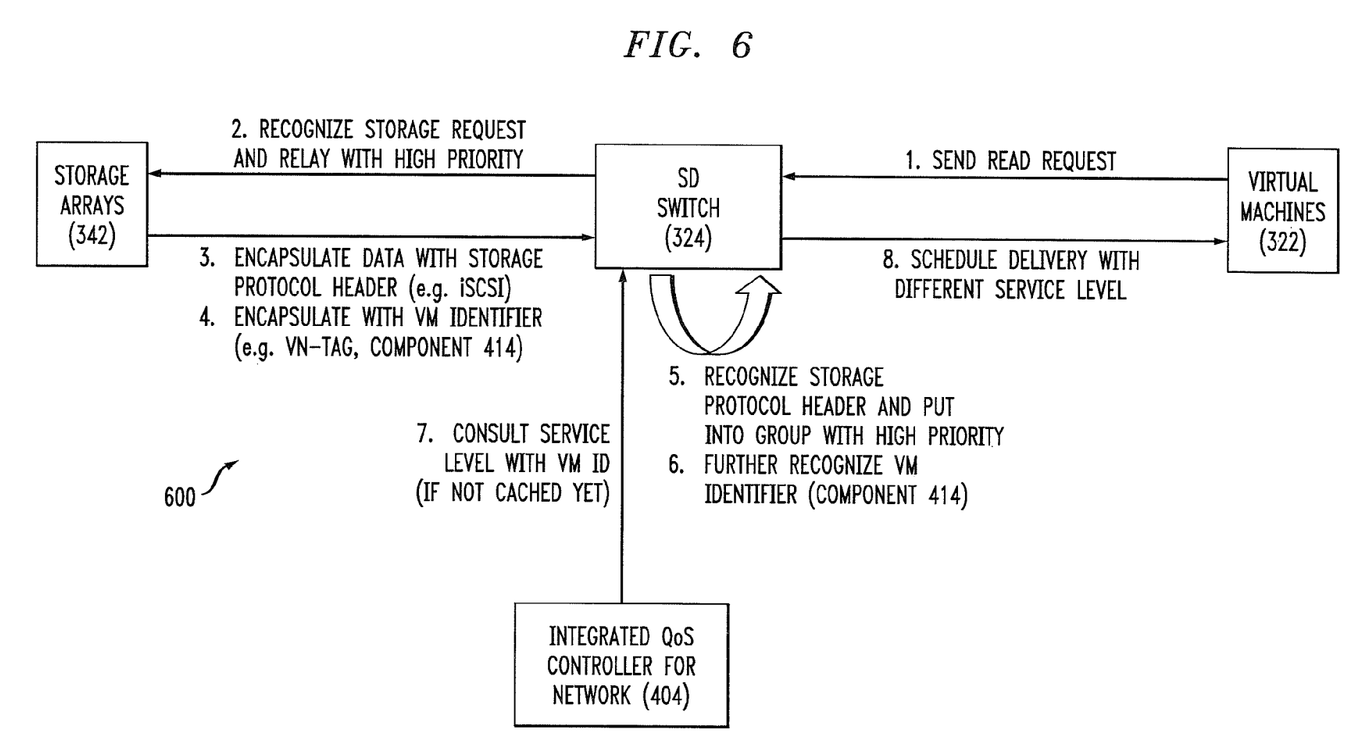
FIG. 6 illustrates a methodology for recognition and prioritized delivery of storage data in accordance with one embodiment of the invention.

Given the illustrative system architecture in FIGS. 3 and 4, various methodologies employed therein are now described in the context of FIGS. 5 and 6.

FIG. 5 illustrates a methodology for storage provisioning in accordance with one embodiment of the invention. As shown in methodology 500, the integrated QoS array control module 402 is shown as being comprises of a controller portion 402-A and a knowledge database portion 402-B. It is to be understood that the QoS data collected by the controller 402-A is stored in the QoS knowledge database 402-B.

Accordingly, as depicted in step 1 of methodology 500, the storage arrays 342 report QoS status to the integrated QoS array controller 402-A, which then updates the QoS knowledge database 402-B in step 2.

It is to be appreciated that while methodology 500 illustrates QoS data being reported from the storage array to the controller, the other components of the control system 300 including, but not limited to, the various switches and VMs are configured to report QoS data to the controller for storage and use in managing requests sent throughout the system.

In step 3, one or more VMs 322 request provisioning of one or more storage arrays from the integrated QoS array controller 402-A, wherein the provisioning request includes one or more QoS requirements. There are several sets of metrics that can be used for QoS requirements. For example, the classical set is comprised of throughput (input/output operations per second or TOPS), response time (milliseconds or ms) and bandwidth (Megabytes per second or MB/s). An email application may have a QoS target: response time less than 30 ms, or a backup application may have another bandwidth of greater than or equal to 20 MB/s. Another example metric set is more business-oriented, for example, by claiming a given I/O packet is for Oracle logs or Microsoft Exchange.

The integrated QoS array controller 402-A then checks, in step 4, with the QoS knowledge database 402-B for the QoS availability of the storage arrays 342 based on the QoS status reported and stored in the database.

In step 5, the QoS knowledge database 402-B replies to the integrated QoS array controller 402-A with the best fit storage array(s) 342 that can accommodate the provisioning request from the one or more VMs 322 (i.e., the storage array(s) 342 that can best meet or exceed the QoS requirements specified by the one or more VMs). The integrated QoS array controller 402-A then provisions the storage request in step 6 using the one or more selected storage arrays 342 and informs the VM 322 of the provisioning result in step 7.

A provisioning example is as follows. The controller 402-A sends a request (e.g., create a new LUN 326 with thick provisioning with 100 GB (Gigabytes) reserved space, and with I/O response time less than or equal to 40 ms desired) directly to a storage array 342, while no other modules in system 400 would necessarily be involved. The request is sent via any type of interfaces provided by storage array 342, e.g., REST (representational state transfer), CLI (command line interface), SOAP (simple object access protocol), etc. The new LUN 326 will be used by VM 322 directly (or indirectly via a hypervisor on a server 340).

FIG. 6 illustrates a methodology for recognition and prioritized delivery of storage data in accordance with one embodiment of the invention. As shown in step 1 of the methodology 600, assume that one of the VMs 322 sends a read request to one of the SD switches 324. It is to be appreciated that the read request is one example of an I/O request or command that can be processed via methodology 600. Other examples of an I/O request may include a write request or a control request.

The SD switch 324, in step 2, recognizes that the read request is to a particular storage array 342 and relays the request with a high priority status to the storage array 342. It is to be understood that the priority status policy (or rule) is set to switch 324 by controller 404, which will be enforced by switch 324 until it is changed by controller 404 again.

In step 3, the storage array 342 encapsulates the data requested by the read request with a given storage protocol header (e.g., iSCSI) and, in step 4, also encapsulates the data with an identifier of the requesting VM 322 (e.g., VN-Tag, which is managed by the access layer virtualization module 414, or by the virtual volume module 412 when a network is not involved). The encapsulated data is sent from the storage array 342 to the SD switch 324.

In step 5, the SD switch 324 recognizes the storage protocol header and places the data into a group with a high priority status. Likewise, in step 6, the SD switch 324 recognizes the requesting VM identifier.

In step 7, the SD switch 324 consults with the integrated QoS network controller 404 to determine the corresponding service level associated with the particular VM identified by the recognized VM identifier. Note that if the SD switch 324 has previously determined the service level associated with the VM (e.g., it may have recently processed another read request for this particular VM), this information can be cached at the SD switch 324. As such, the SD switch would not have to perform step 7 if it has the information already cached. The SD switch 324, in step 8, then schedules delivery of the data (and then delivers it) based on the appropriate service level determined in step 7.

Advantageously, as illustratively explained herein in accordance with one or more embodiments of the invention, the integrated storage QoS controller provides a feasible and practical way to ensure storage QoS delivery in data processing systems such as data centers. The power of storage arrays is maximized by aggregating and consolidating QoS resources from individual arrays. VMs can run in an isolated manner with performance assurance, with visibility to networks and storage arrays (via technologies like VN-Tag/NPIV/vVol). Software-defined networking methodology is applied to all types of networks to perform unified management, with prioritized optimization for storage protocols (e.g. iSCSI, NFS) based on protocol recognition. With QoS measurement and analysis, it is possible to exploit I/O scheduling characteristics, locate problems/bottlenecks and prevent attacks against QoS (e.g., side channel).

The storage QoS controller improves efficiency to meet demands. It obtains more information about the infrastructure. The controller is a tool that focuses on optimization besides allocation, with insight into providers and consumers of those resources and their relationships. Also, both real time and historical information is used to manage dynamic resources, such as IOPS and network bandwidth. The controller traces connectivity from VMs to storage providing end-to-end visibility, from VMs, to hosts, to network, to storage, as well as top-to bottom visibility within the virtualization host, from guest operating system (OS) to VM, to virtual network interface cards (NICs), host bus adaptors (HBAs) and switches, to the physical host server.

Furthermore, the storage QoS controller embodiments advantageously provide overall QoS control over components (e.g., VMs/servers, switches, storage arrays/LUNs) along the entire path of an I/O request (I/O path) based on, for example, QoS status (or knowledge) of storage arrays (as provider), networks (as logistics) and hypervisors (as retailer). It is to be appreciated that data delivery with QoS assurance cannot be achieved if QoS control is done in isolation as it is done in existing QoS approaches, but can only be assured when QoS control is a collaborative process throughout the entirety of the I/O path as is done in embodiments of the invention.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   collecting, at a controller, quality-of-service data from components of a distributed virtual infrastructure, wherein the components of the distributed virtual infrastructure comprise one or more storage units, one or more processing units, and one or more switches operatively coupled to form the distributed virtual infrastructure;
   storing, via the controller, the obtained quality-of-service data in a quality-of-service knowledge database of the controller, wherein the database aggregates and consolidates the quality-of-service data collected from the components of the distributed virtual infrastructure; and
   managing, via the controller, quality-of-service control for at least one input/output request received by the distributed virtual infrastructure, wherein for the at least one input/output request, a path is identified comprising a plurality of components of the distributed virtual infrastructure through which the input/output request passes, and the input/output request is serviced based on the quality-of-service data stored for each of the plurality of components of the distributed virtual infrastructure, and wherein the plurality of components of the distributed virtual infrastructure comprises at least one of the one or more processing units, at least one of the one or more switches, and at least one of the one or more storage units, and further wherein the managing step comprises receiving a storage provisioning request, at the controller, from at least one of the one or more processing units, wherein the storage provisioning request comprises one or more quality-of-service requirements, and managing provisioning of the one or more storage units based on at least a portion of the collected quality-of-service data in response to the storage provisioning request;
   wherein the obtaining, storing and managing steps are executed via at least one processor coupled to a memory.

2. The method of claim 1, wherein the managing step further comprises, in response to the at least one input/output request, managing data delivery from the one or more storage units based on at least a portion of the collected quality-of-service data.

3. The method of claim 1, wherein the managing step further comprises checking, at the controller, the stored quality-of-service data for availability of at least one of the one or more storage units, in response to the received storage provisioning request.

4. The method of claim 3, wherein the managing step further comprises selecting, at the controller, an appropriate one of the one or more storage units based on the availability check.

5. The method of claim 4, wherein the managing step further comprises causing, by the controller, the provisioning of the selected one of the one or more storage units.

6. The method of claim 1, wherein the managing step further comprises identifying, at the controller, a service level associated with one of the one or more processing units, in response to a request received from one of the one or more switches operatively positioned between the one or more storage units and the one or more processing units.

7. The method of claim 6, wherein the request received at the controller from the switch is in response to the at least one input/output request being received at the switch from the one of the one or more processing units.

8. The method of claim 7, wherein the switch responds to the input/output request by relaying the request to at least one of the one or more storage units with a given priority level.

9. The method of claim 8, wherein the switch receives data from the one of the one or more storage units based on the relayed input/output request.

10. The method of claim 9, wherein the switch identifies the received data as being associated with the one of the one or more processing units that sent the input/output request.

11. The method of claim 10, wherein the service level is identified by recognition of at least one of a storage protocol and a processing unit identifier.

12. The method of claim 10, wherein the switch requests, from the controller, the identified service level associated with the one of the one or more processing units that sent the input/output request.

13. The method of claim 12, wherein the switch delivers the received data to the one of the one or more processing units that sent the input/output request in accordance with the service level identified by the controller.

14. The method of claim 1, wherein the one or more switches comprise one or more software-defined switches.

15. The method of claim 1, wherein the one or more storage units comprise one or more storage arrays, and the one or more processing units comprise one or more virtual machines.

16. The method of claim 1, wherein the distributed virtual infrastructure comprises a cloud computing environment.

17. A computer program product comprising a processor-readable storage medium having encoded therein executable code of one or more software programs, wherein the one or more software programs when executed by at least one processor implement the steps of:

collecting, at a controller, quality-of-service data from components of a distributed virtual infrastructure, wherein the components of the distributed virtual infrastructure comprise one or more storage units, one or more processing units, and one or more switches operatively coupled to form the distributed virtual infrastructure;

storing, via the controller, the obtained quality-of-service data in a quality-of-service knowledge database of the controller, wherein the database aggregates and consolidates the quality-of-service data collected from the components of the distributed virtual infrastructure; and managing, via the controller, quality-of-service control for at least one input/output request received by the distributed virtual infrastructure, wherein for the at least one input/output request, a path is identified comprising a plurality of components of the distributed virtual infrastructure through which the input/output request passes, and the input/output request is serviced based on the quality-of-service data stored for each of the plurality of components of the distributed virtual infrastructure, and wherein the plurality of components of the distributed virtual infrastructure comprises at least one of the one or more processing units, at least one of the one or more switches, and at least one of the one or more storage units, and further wherein the managing step comprises receiving a storage provisioning request, at the controller, from at least one of the one or more processing units, wherein the storage provisioning request comprises one or more quality-of-service requirements, and managing provisioning of the one or more storage units based on at least a portion of the collected quality-of-service data in response to the storage provisioning request.

18. A storage quality-of-service controller, comprising:
at least one memory; and
at least one processor operatively coupled to the at least one memory, forming the storage quality-of-service controller, configured to:

collect quality-of-service data from components of a distributed virtual infrastructure, wherein the components of the distributed virtual infrastructure comprise one or more storage units, one or more processing units, and one or more switches operatively coupled to form the distributed virtual infrastructure;

store the obtained quality-of-service data in a quality-of-service knowledge database, wherein the database aggregates and consolidates the quality-of-service data collected from the components of the distributed virtual infrastructure; and manage quality-of-service control for at least one input/output request received by the distributed virtual infrastructure, wherein for the at least one input/output request, a path is identified comprising a plurality of components of the distributed virtual infrastructure through which the input/output request passes, and the input/output request is serviced based on the quality-of-service data stored for each of the plurality of components of the distributed virtual infrastructure, and wherein the plurality of components of the distributed virtual infrastructure comprises at least one of the one or more processing units, at least one of the one or more switches, and at least one of the one or more storage units, and further wherein managing quality-of-service control comprises receiving a storage provisioning request from at least one of the one or more processing units, wherein the storage provisioning request comprises one or more quality-of-service requirements, and managing provisioning of the one or more storage units based on at least a portion of the collected quality-of-service data in response to the storage provisioning request.

19. The method of claim 1, wherein the managing step further comprises assigning, by the controller, a priority status to the at least one input/output request based on the stored quality-of-service information collected for the components of the distributed virtual infrastructure.

* * * * *